US012525220B1

United States Patent
Piskala et al.

(10) Patent No.: US 12,525,220 B1
(45) Date of Patent: Jan. 13, 2026

(54) ENHANCED AUTOMATIC SPEECH RECOGNITION TO AVOID MISRECOGNITION OF VOICE UTTERANCES

(71) Applicant: Amazon Technologies, Inc., Seattle, WA (US)

(72) Inventors: Deepak Babu Rajaram Piskala, Bellevue, WA (US); Sethuraman Ramachandran, Issaquah, WA (US); Andreas Stolcke, Berkeley, CA (US)

(73) Assignee: Amazon Technologies, Inc., Seattle, WA (US)

( * ) Notice: Subject to any disclaimer, the term of this patent is extended or adjusted under 35 U.S.C. 154(b) by 214 days.

(21) Appl. No.: 18/321,235

(22) Filed: May 22, 2023

(51) Int. Cl.
*G10L 15/01* (2013.01)
*G10L 15/06* (2013.01)
*G10L 15/22* (2006.01)

(52) U.S. Cl.
CPC ............ *G10L 15/01* (2013.01); *G10L 15/063* (2013.01); *G10L 15/22* (2013.01); *G10L 2015/223* (2013.01); *G10L 2015/225* (2013.01)

(58) Field of Classification Search
USPC ...................................................... 704/1–504
See application file for complete search history.

(56) References Cited

U.S. PATENT DOCUMENTS

| | | | | |
|---|---|---|---|---|
| 7,844,458 B2 * | 11/2010 | Hirota | ................. | G10L 15/1822 704/275 |
| 7,873,523 B2 * | 1/2011 | Potter | ..................... | G10L 15/01 704/275 |
| 8,055,502 B2 * | 11/2011 | Clark | .................... | H04M 1/271 704/243 |
| 8,296,145 B2 * | 10/2012 | Clark | .................... | H04M 1/271 704/243 |
| 8,438,028 B2 * | 5/2013 | Chengalvarayan | ... | G10L 15/063 704/254 |
| 8,682,660 B1 * | 3/2014 | Lyudovyk | ............. | G10L 15/197 704/239 |

(Continued)

FOREIGN PATENT DOCUMENTS

WO  WO-2022050970 A1 *  3/2022  ............. G10L 15/22

*Primary Examiner* — Marcus T Riley
(74) *Attorney, Agent, or Firm* — Eversheds Sutherland (US) LLP

(57) ABSTRACT

A method for detecting misrecognized voice utterances for which automated responses are presented may include inputting, to a post-speech recognition device, possible misrecognized utterances for respective utterances; inputting, to the post-speech recognition device, an interpretation of an utterance of a user, the utterance including a command; determining, using the post-speech recognition device, based on the possible misrecognized utterances, that the interpretation of the utterance is a misrecognition of the utterance; identifying, using the post-speech recognition device, based on the possible misrecognized utterances, a corrected utterance for the interpretation of the utterance, wherein the corrected utterance is different than the interpretation of the utterance; selecting, using the ASR model, the corrected utterance to replace the interpretation of the utterance; and sending the corrected utterance to a device associated with generating a response to the command to present to the user.

20 Claims, 7 Drawing Sheets

(56) References Cited

U.S. PATENT DOCUMENTS

| | | | |
|---|---|---|---|
| 9,997,155 B2* | 6/2018 | Grost | G10L 15/02 |
| 11,158,307 B1* | 10/2021 | Ghias | G06N 3/044 |
| 11,380,304 B1* | 7/2022 | Ponnusamy | G10L 15/1822 |
| 11,386,890 B1* | 7/2022 | Fan | G06F 40/30 |
| 11,495,208 B2* | 11/2022 | Ganong, III | G10L 15/08 |
| 11,508,361 B2* | 11/2022 | Madwed | G10L 15/26 |
| 11,521,597 B2* | 12/2022 | Sharifi | G06F 3/16 |
| 11,610,586 B2* | 3/2023 | Qiu | G10L 15/08 |
| 11,823,664 B2* | 11/2023 | Sharifi | G10L 13/02 |
| 12,142,263 B2* | 11/2024 | Danielescu | G10L 15/30 |
| 2007/0005354 A1* | 1/2007 | Potter | H04M 3/4938 |
| | | | 704/231 |
| 2007/0100636 A1* | 5/2007 | Hirota | G10L 15/1822 |
| | | | 704/E15.026 |
| 2008/0126091 A1* | 5/2008 | Clark | H04M 1/271 |
| | | | 704/E15.047 |
| 2010/0023320 A1* | 1/2010 | Di Cristo | G10L 15/22 |
| | | | 704/E15.001 |
| 2011/0288867 A1* | 11/2011 | Chengalvarayan | G10L 15/1815 |
| | | | 704/251 |
| 2012/0053943 A1* | 3/2012 | Clark | G10L 15/22 |
| | | | 704/E15.005 |
| 2012/0109649 A1* | 5/2012 | Talwar | G10L 15/08 |
| | | | 704/E15.001 |
| 2017/0069311 A1* | 3/2017 | Grost | G10L 15/26 |
| 2018/0158448 A1* | 6/2018 | Ganong, III | G10L 15/01 |
| 2021/0183366 A1* | 6/2021 | Reinspach | G10L 15/02 |
| 2021/0375272 A1* | 12/2021 | Madwed | G06F 3/167 |
| 2022/0068261 A1* | 3/2022 | Sharifi | G06F 3/16 |
| 2023/0059469 A1* | 2/2023 | Sharifi | G06F 3/16 |
| 2023/0089285 A1* | 3/2023 | Fan | G10L 15/22 |
| 2023/0119954 A1* | 4/2023 | Madwed | G06F 3/167 |
| | | | 704/9 |
| 2024/0096313 A1* | 3/2024 | Danielescu | G10L 15/16 |

\* cited by examiner

| input text | ASR error in carrier phrase (CP) | | Head - ASR item slot error (brands and PT) | | | Torso and Tail ASR brand errors | | | |
|---|---|---|---|---|---|---|---|---|---|
| | when will the wedding gross arrive | when is my police vest opposed to arrive | show me an acids | reorder nivea men's bod wash | order the case smart | order a singlet smart bulb | order why fi router | is there a vapor rub that's not menthol scented | reorder salem husk capsules | add tecon duraga pencils to my cart | show me shore wireless guitar plugs | show me zoomer toys for ages three | add bare orange aspirin tablets to my cart |
| output text (k=1) | when will the wedding gross arrive | when is my police vest opposed to arrive | show me an acids | reorder nivea men's bod wash | order the case smart | order a singlet smart bulb | order why fi router | is there a vapor rub that's not menthol scented | reorder salem husk capsules | add tecon duraga pencils to my cart | show me shore wireless guitar plugs | show me zoomer toys for ages three | add bare orange aspirin tablets to my cart |
| output text (k=2) | when will the wedding gown arrive | when is my police vest opposed to arrive | show me an acids | reorder nivea men's body wash | order the case smart | order a sengled smart bulb | order wi-fi router | is there a vapor rub that's not menthol scented | reorder salem husk capsules | add tecon duraga pencils to my cart | show me shore wireless guitar plugs | show me zoomer toys for ages three | add bare orange aspirin tablets to my cart |
| output text (k=3) | when will the wedding grill arrive | when does my police vest opposed to arrive | show me n acids | reorder nivea men's bath wash | order the case smart | order sengled smart bulb | order wi-fi router | is there a vaporub thats not menthol scented | reorder salem husk capsules | add tie con duraga pencils to my cart | show me beach wireless guitar plugs | show me zoomer toy for ages three | add bare orange aspirin tablets to my cart |
| output text (k=4) | when will the wedding dress arrive | when's my police vest opposed to arrive | show me an antacid | reorder nivea men's bate wash | order a case smart | order a sengled smart plug | order wifi router | is there vapor rub that not menthol scented | reorder salem husk capsules | add tie con duraga pencils to my cart | show me short wireless guitar plugs | show me z zoomer toys for ages three | add bare orange aspirin tablets to my cart |
| output text (k=5) | when will the wedding costume arrive | when is my police vests opposed to arrive | show me an acid | reorder nivea men's bodywash | order that case smart | order the sengled smart bulb | order wide wi-fi router | is there a vapor rub that is not menthol scented | reorder salem husk capsules | add tycon duraga pencils to my cart | show me shark wireless guitar plug | show me zoomer toys for ages three | add barseorange aspirin tablets to my cart |
| output text (k=6) | when will the wedding cloth arrive | when is my police vest supposed to arrive | show me in acids | reorder nivea men's bonuto wash wash | order the case smart | order an sengled smart bulb | order white wi-fi router | is there a vapor rug that not menthol scented | reorder solomo husk capsules | add tycon duraga pencils to my cart | show me shark wireless guitar plugs | show me zoomer toys for ages three | add bare-orange oranges aspirin tables to my cart |

FIG. 3

ENHANCED AUTOMATIC SPEECH RECOGNITION TO AVOID MISRECOGNITION OF VOICE UTTERANCES

BACKGROUND

Automatic speech recognition (ASR) combined with language processing techniques can enable a computing device to retrieve and process commands from a user based on spoken utterances of the user. The utterances may include user commands. When an utterance is misrecognized, the commands may be misrecognized, and the responses to the commands may not be what a user intended.

BRIEF DESCRIPTION OF THE DRAWINGS

To easily identify the discussion of any particular element or act, the most significant digit or digits in a reference number refer to the figure number in which that element is first introduced.

FIG. 3 illustrates a table showing example utterance corrections using the multi-task automatic speech recognition model of FIG. 2, in accordance with one or more embodiments of the present disclosure.

Figure 1A:
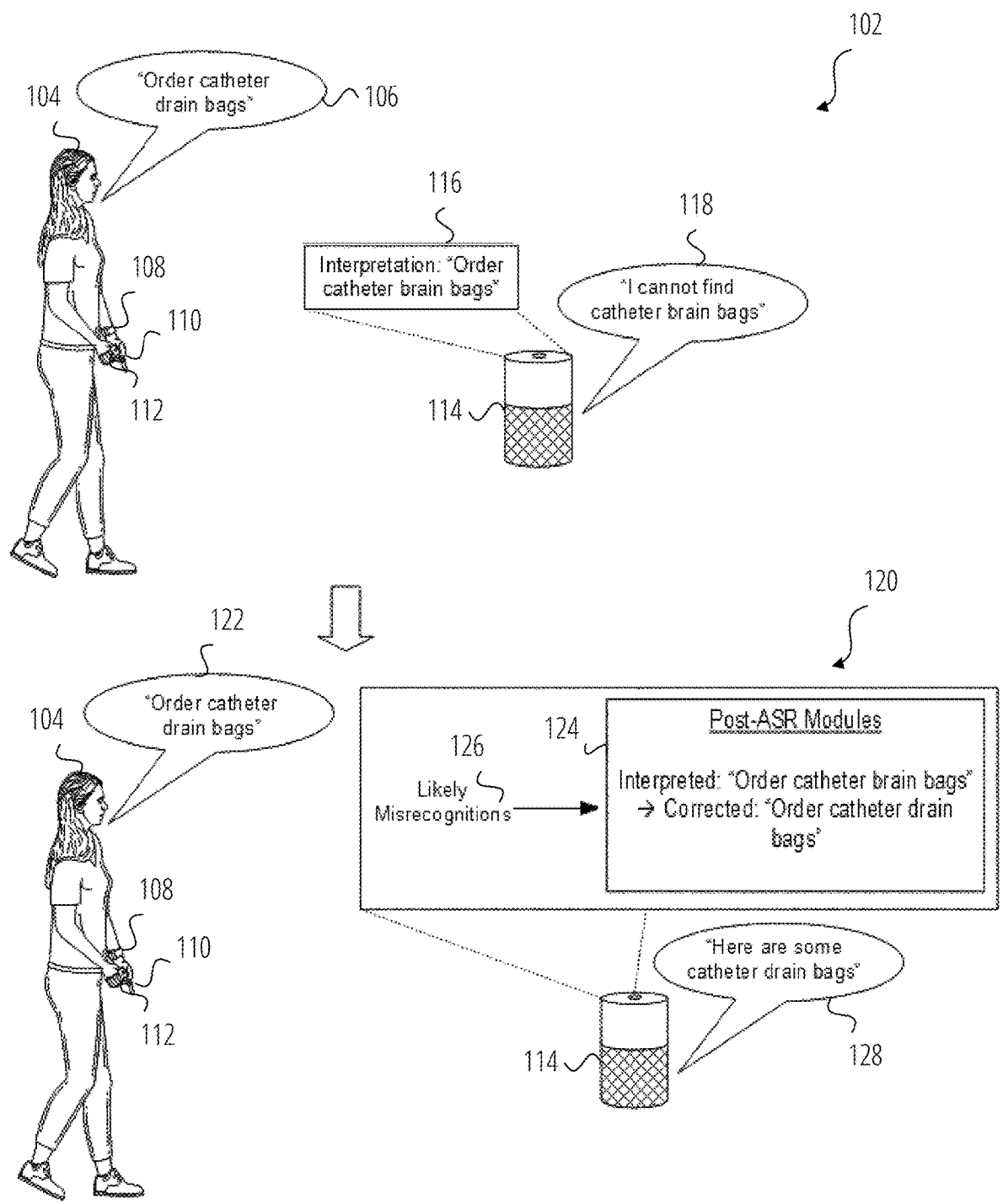
FIG. 1A illustrates example processes for automatic speech recognition, in accordance with one or more embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Automatic speech recognition (ASR) is a field of computer science, artificial intelligence, and linguistics concerned with transforming audio data associated with speech into text data representative and/or other encodings and/or machine representations of that speech. Natural language understanding (NLU) is a field of computer science, artificial intelligence, and linguistics concerned with enabling computers to derive meaning from text input containing natural language, rather than specific commands or instructions. Text-to-speech (TTS) is a field of computer science, artificial intelligence, and linguistics concerned with enabling computers to output synthesized speech. ASR, NLU, and TTS can be used together as part of a speech processing system.

Spoken language understanding (SLU) is a field of computer science, artificial intelligence, and/or linguistics that receives spoken language as an input, interprets the input, and generates commands that may be executed by one or more other computing devices and/or speech processing components. In various examples, spoken language understanding may be a combination of ASR systems and NLU systems, while in other examples, spoken language understanding may be a single model effective to perform the functions of both ASR and NLU. In various further examples, SLU may include TTS where a machine learning model may receive input audio data (e.g., a user utterance) and may generate output audio data in response to the utterance.

A speech-controlled computing system may answer user commands from voice utterances by interpreting the intent of a voice utterance, determining one or more commands, and responding to the commands. For example, a voice utterance intent may be for a user to be presented content or products, select content or products for purchase, to be provided with answers to inquiries, or the like. When the user voice utterance is misrecognized, the intent and corresponding commands and responses may not be what the user intended. As an example, when a user utters, "Order catheter drain bags," but the system hears, "Order catheter brain bags" as a misrecognition, the user intent may be misrecognized as to purchase catheter brain bags instead of the catheter drain bags intended (e.g., whether or not catheter brain bags are a real item that can be purchased). In another example, if a user voice utterance requests presentation of media, such as a song, but the utterance is misrecognized, the incorrect song may be played in response. In this manner, misrecognition of user voice utterances and their intentions may undermine user experience.

In some systems, a voice utterance may be analyzed using a two-staged TTS simulation followed by ASR decoding using a target ASR model. Such is an expensive and time-consuming process.

In one or more embodiments, to reduce ASR misrecognitions of voice utterances, a multi-task ASR transformer-based large language model (LLM) may learn the most likely misrecognitions of voice utterances, bypassing the need for audio simulation and expensive ASR decoding. In this manner, the multi-task ASR model may learn the different ways that an utterance may be misrecognized without having to analyze a previous TTL plus ASR decoding to identify whether the previous TTL plus ASR decoding was properly recognized. To avoid analysis of a previous TTL plus ASR decoding, the multi-task ASR model may be trained with error prompts, including the ways that a given utterance may be misrecognized. Using the example above, an utterance of "Order catheter drain bags" may have multiple misrecognitions provided to the multi-task ASR model, such as "Order catheter brain bags." When the multi-task ASR model identifies a voice utterance of "Order catheter brain bags," which is a known misrecognition not necessarily based on a previous misrecognition of the multi-task ASR model, the multi-task ASR model may determine that the recognized voice utterance was misrecognized and should be identified as "Order catheter brain bags," for which the misrecognized utterance is a known error. In this manner, the multi-task ASR model may use a "corrupt" prefix to generate the likely misrecognition, and with beam search decoding, the multi-task ASR model may generate different ways that any utterance may be misrecognized.

In one or more embodiments, the multi-task ASR model may detect recognition errors in utterances, correct the errors, identify misrecognized tokens, and predict likely misrecognitions from synthetic text utterances. Architecturally, the multi-task ASR model may be, but is not limited to, a sequence-to-sequence text-only model with BART-large, which may accept an input text utterance with a prefix or prompt indicating a desired outcome that includes "corrupt," "correct," "predict", or "is error?" The multi-task ASR model may be obtained by fine-tuning BART-large with a large-scale multi-task dataset of ASR transcriptions. The multi-task ASR model may model error correction by accepting an utterance with or without misrecognitions, and autoregressively generating an utterance with a correction or emitting the input as-is when there is nothing to correct. The multi-task ASR model may model corruption by accepting a synthetic text utterance that is error-free, and autoregressively generating possible ways that the utterance may be misrecognized (e.g., "brain bag" vs. "drain bag" as described above). The multi-task ASR model may model error detection by accepting an utterance with or without misrecognition, and generating an "error" or "no error" output. The multi-task ASR model may model incorrect token prediction by accepting an utterance with or without misrecognition, and generating one or more tokens representing likely ASR misrecognitions or emitting "no error" when an utterance is error-free.

In one or more embodiments, the multi-task ASR model may detect and correct misrecognized utterances without requiring feedback indicating whether a previous TTL plus ASR interpretation of an utterance was correct or misrecognized. The training data for the multi-task ASR model may be input with ASR error correction, corruption, error detection, and incorrect token prediction datasets that may be distinguished from feedback indicating whether a previous TTL plus ASR interpretation of an utterance was correct or misrecognized. As a result, the multi-task ASR model may avoid misrecognitions and may be less expensive and time-consuming than a two-staged TTS simulation followed by ASR decoding using a target ASR model.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1A illustrates example processes for automatic speech recognition, in accordance with one or more embodiments of the present disclosure.

Referring to FIG. 1A, a process 102 may include a user 104 providing a voice utterance 106. The voice utterance 106 may be detected by one or more devices (e.g., device 108, device 110, device 112, and device 114, which may include smart phones, tablets, wearable devices, smart home devices, and the like). The device that detects the utterance 106 may analyze the utterance 106, or may send the utterance 106 to another device for analysis. The analysis may include a speech recognition 116 to identify what the user 104 said and intended. In the example shown, the utterance 106 is, "Order catheter drain bags." The interpretation of the utterance 106 from the speech recognition 116 may be, "Order catheter brain bags," which would be a misrecognition of the utterance 106. The analysis of the utterance 106 may result in a response 118 based on the intent of the utterance 106, such as to present content, add an item to a virtual shopping cart, purchase an item, answer a question, or the like. When the utterance 106 intent is to order/purchase an item, the item may be identified from a catalog of items. However, when the speech recognition 116 misrecognizes the utterance 106, an incorrect response may be presented, such as selecting the wrong item (e.g., a catheter brain bag instead of catheter drain bag) for purchase or, as shown, when the item does not exist, the response 118 may indicate that no such item is available for purchase.

Still referring to FIG. 1A, a process 120 may use enhanced ASR. The user 104 may provide a voice utterance 122 (e.g., "Order catheter drain bags") that may be detected by the one or more devices and analyzed by the one or more devices or another device. The enhanced ASR may use a post-ASR modules 124 with likely misrecognitions 126 of utterances as inputs. The post-ASR modules 124 may recognize the utterance 122 as, "Order catheter brain bags," detect that, "Order catheter brain bags" is a likely misrecognition for an utterance of, "Order catheter drain bags" (e.g., based on the misrecognitions 126), and may correct the recognized utterance to, "Order catheter drain bags." The corrected utterance of the post-ASR modules 124 may be used to ascertain the intent of the utterance, which may be to order an item (e.g., catheter drain bags). Due to the corrected utterance, the proper intent and product may be identified, and a response 128 to the voice utterance 122 may be to present catheter drain bags available for purchase (e.g., an audio and/or visual response 128).

Figure 1B:
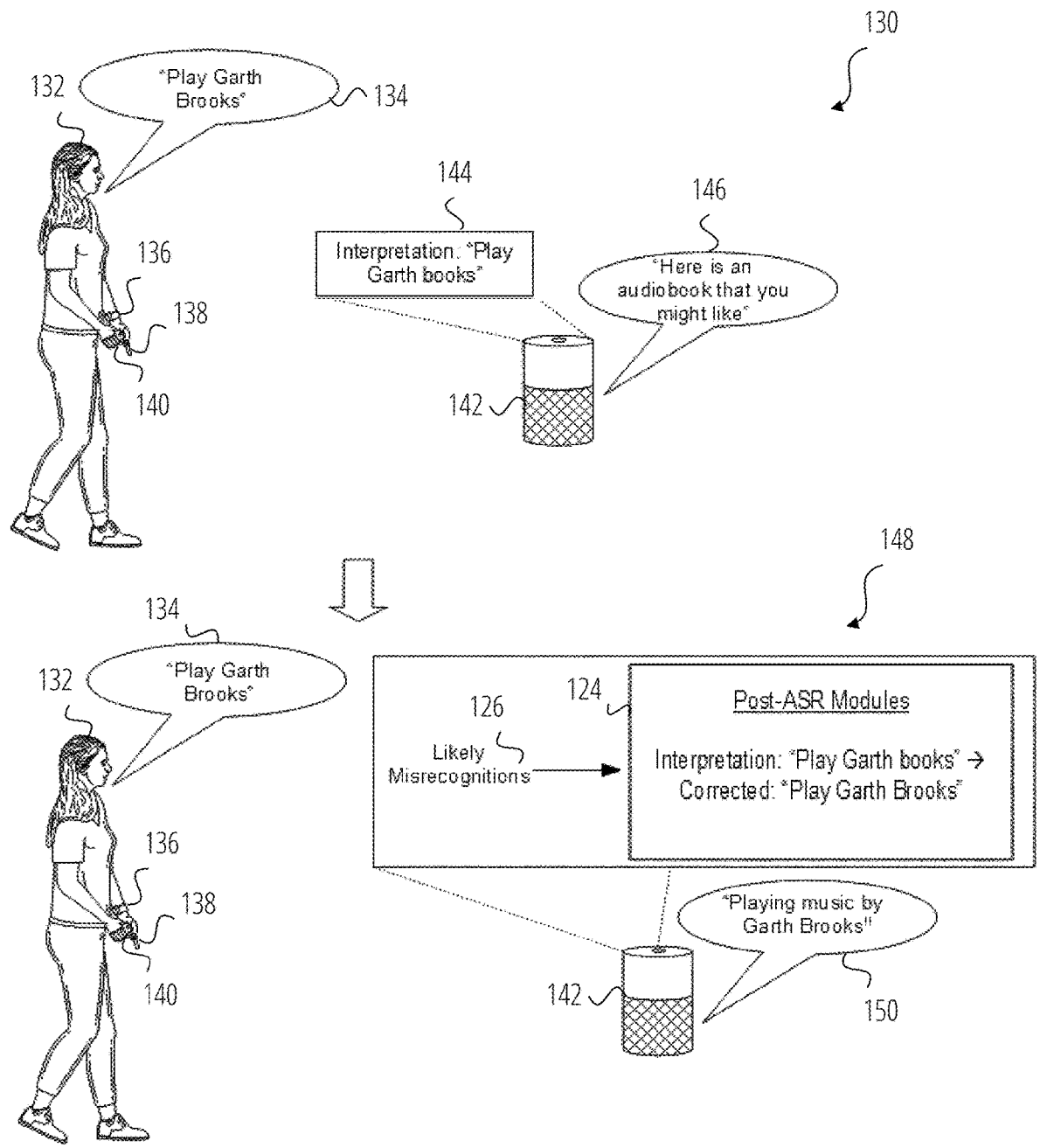
FIG. 1B illustrates example processes for automatic speech recognition, in accordance with one or more embodiments of the present disclosure.

FIG. 1B illustrates example processes for automatic speech recognition, in accordance with one or more embodiments of the present disclosure.

Referring to FIG. 1B, a process 130 may include a user 132 providing a voice utterance 134 that may be detected by one or more devices (e.g., device 136, device 138, device 140, and device 142, which may include smart phones, tablets, wearable devices, smart home devices, and the like). The device that detects the utterance 134 may analyze the utterance 134, or may send the utterance 134 to another device for analysis. The analysis may include a speech recognition 144 to identify what the user 132 said and intended. In the example shown, the utterance 134 is, "Play Garth Brooks," referring to the musician. The interpretation of the utterance 134 by the speech recognition 144 may be, "Play Garth books," which would be a misrecognition of the utterance 134 as referring to books, such as audiobooks. The analysis of the utterance 134 may result in a response 146 based on the intent of the utterance 134, such as to present content, add an item to a virtual shopping cart, purchase an item, answer a question, or the like. When the utterance 134 intent is to present content, the content may be identified from a catalog of content. However, when the speech recognition 144 misrecognizes the utterance 134, an incorrect response may be presented, such as selecting the wrong content (e.g., an audiobook instead of music) for presentation.

Still referring to FIG. 1B, a process 148 may use enhanced ASR. The user 132 may provide the voice utterance 134 (e.g., "Play Garth Brooks") that may be detected by the one or more devices and analyzed by the one or more devices or another device. The enhanced ASR may use a post-ASR modules 124 with the likely misrecognitions 126 of utterances as inputs. The post-ASR modules 124 may recognize the utterance 134 as, "Play Garth books," detect that, "Play Garth books is a likely misrecognition for an utterance of, "Play Garth Brooks" (e.g., based on the misrecognitions 126), and may correct the recognized utterance to, "Play Garth Brooks." The corrected utterance of the post-ASR modules 124 may be used to ascertain the intent of the utterance, which may be to present content (e.g., music). Due to the corrected utterance, the proper intent and product may be identified, and a response 150 to the voice utterance 134 may be to present music by Garth Brooks (e.g., an audio and/or visual response 150).

Figure 2:
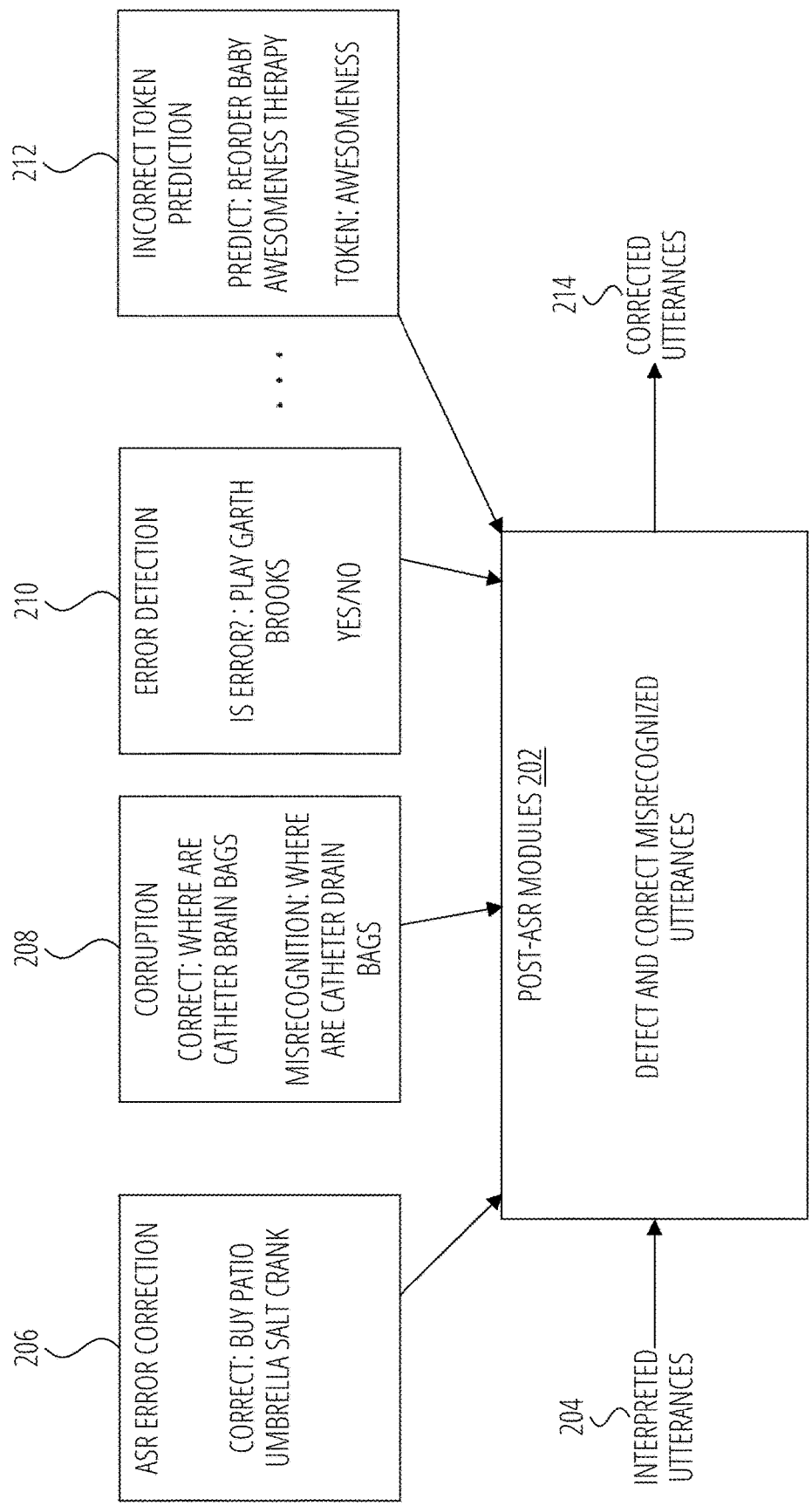
FIG. 2 illustrates an example multi-task automatic speech recognition model, in accordance with one or more embodiments of the present disclosure.

FIG. 2 illustrates an example multi-task automatic speech recognition model (e.g., a Post-ASR modules 202), in accordance with one or more embodiments of the present disclosure.

Referring to FIG. 2, the post-ASR modules 202 (e.g., representing the post-ASR modules 124 of FIG. 1A and FIG. 1B) may be a unified prompt-based LLM capable of detecting recognition errors in utterances, correcting errors, identifying misrecognized tokens, and predicting likely misrecognition from synthetic text utterances. Architecturally, the post-ASR modules 202 may be a seq2seq text-only model (e.g., with 406M parameter BART-large, or another model) that accepts input interpretations of text utterances (e.g., interpreted utterances 204, such as utterances interpreted by ASR or other techniques) with a prefix or prompt indicating desired outcome that includes "corrupt", "correct", "predict", "is error?" The post-ASR modules 202 may be obtained by fine-tuning BART-large (e.g., with a large scale 32M multi-task dataset of ASR transcriptions), and may be trained for EFD and en-US locale. The following tasks may be modeled by the post-ASR modules 202: ASR error correction 206 (e.g., accepts an utterance with or without misrecognitions, autoregressively generates an utterance with correction or emits the input as-is if there is nothing to correct), corruption 208 (e.g., accepts a synthetic text utterance that is error-free. Autoregressively generates possible ways the utterance could get misrecognized-serving as a low-cost alternative to TTS based ASR evaluation), error detection 210 (e.g., accepts an utterance with or without misrecognition. Generates "Error" or "No Error"), and/or incorrect token prediction 212 (e.g., accepts an utterance with or without misrecognition. Model generates token(s) that are likely ASR misrecognitions or emit "No Error" if utterance is error-free). In this manner, the post-ASR modules 202 may input the interpreted utterances 204 and generate corrected utterances 214 (e.g., as shown in FIG. 1A and FIG. 1B).

In one or more embodiments, the data used for training the post-ASR modules 202 may arise from a combination of ADS human transcriptions, ASR production model (e.g., n-best (n=5)), and TTS-based simulation methods. For the ASR error correction 206, the error:non-errors ratio may be maintained at 1:1 to upsample ASR errors and encourage LLM to generate rewrites or corrections. The ASR error correction 206 dataset may be used to generate data for the remaining three tasks by changing inputs prompts and target y labels. The data for the corruption 208 task may be generated by swapping the input and output labels from the ASR error correction 206 task. The training/test data may uniformly sampled across the tasks, and may represent equal importance in optimization among the tasks. For example, the ASR error correction 206 dataset may include ASR errors and non-errors. A corruption 208 dataset may be added to the ASR error correction 206 dataset. An error detection 210 dataset may be added with ASR errors and non-errors. An incorrect token prediction 212 dataset including ASR errors and non-errors may be added to the dataset. The mix of human and augmented dataset may result in 32M and 5M of training and testing instances, respectively.

In one or more embodiments, when the post-ASR modules 202 uses a BART large model, the BART large model may include 12 encoder and 12 decoder layers with a total of 406M parameters trained using cross-entropy loss. The post-ASR modules 202 may be fine-tuned on the 32M dataset with two epochs on a p3.2x1 GPU instance, for example. To optimize memory/speed of training, the post-ASR modules 202 use multiple techniques, including gradient checkpointing and accumulation, smaller batch size, and/or reduced floating point precision (e.g., fp16 instead of fp32), which may overcome any memory issues. An Adam optimizer with weight decay of 0.01 may be used for training the post-ASR modules 202.

In one or more embodiments, while the post-ASR modules 202 may be a multi-task model intended to solve ASR-related tasks, an objective of the post-ASR modules 202 may be to improve error correction accuracy by transfer learning from other related tasks. For the ASR error correction 206, the post-ASR modules 202 may use a H2 2021 dataset to get an unbiased read on performance. A BART model trained without any optimization shows recovery of 22% fatal errors @top-K=2 and 34% @top-k=10 using just utterance text (non-audio). The recovery of errors at top-1 is low at 5% since the training data was not class-balanced with non-errors dominating the data and model mirrors this risk-averse behavior. 3.52% of non-errors have incorrect prediction, but manual inspection of same reveals these are primarily non-fatal ASR errors (e.g., stemming, punctuation, etc.) injected that should not cause a major CX impact. FIG. 3 below shows some example corrections generated by the post-ASR modules 202.

Referring still to FIG. 2, the training data for the ASR error correction 206, the corruption 208, the error detection 210, and the incorrect token prediction 212 may be distinguished from feedback indicating whether previous speech recognition 116 interpretationsresulted in correct recognition or the misrecognitions 126 of voice utterances. The training data may include known or likely misrecognitions of utterances, and learned (e.g., most likely) misrecognitions 126 of utterances. In this manner, the training data for the post-ASR modules 202 may not require analysis of previous speech recognition 116 interpretation.

FIG. 3 illustrates a table 300 showing example utterance corrections using the multi-task automatic speech recognition model of FIG. 2, in accordance with one or more embodiments of the present disclosure.

The top row shows the input utterance (e.g., with ASR errors) and 2+ rows show the output result of beam search decoding that generates top-K hypothesis (only k=5 shown). The top-K hypothesis may be ranked based on log-likelihood scores, and lower rank hypothesis may be preferred. The post-ASR modules 202 may correct grammatical errors, spelling errors in head products fairly robustly irrespective of the variations in a product request. For example: "clothes" and "close" are often confused by ASR, but the post-ASR modules 202 recovers any variation of fashion query with "close" and corrects to "clothes." The post-ASR modules 202 provides some recoverability in torso and tail products due to the large fine-tuning dataset used. Circled entries indicate the ground-truth for the utterance in Table 1 below.

Figure 4:
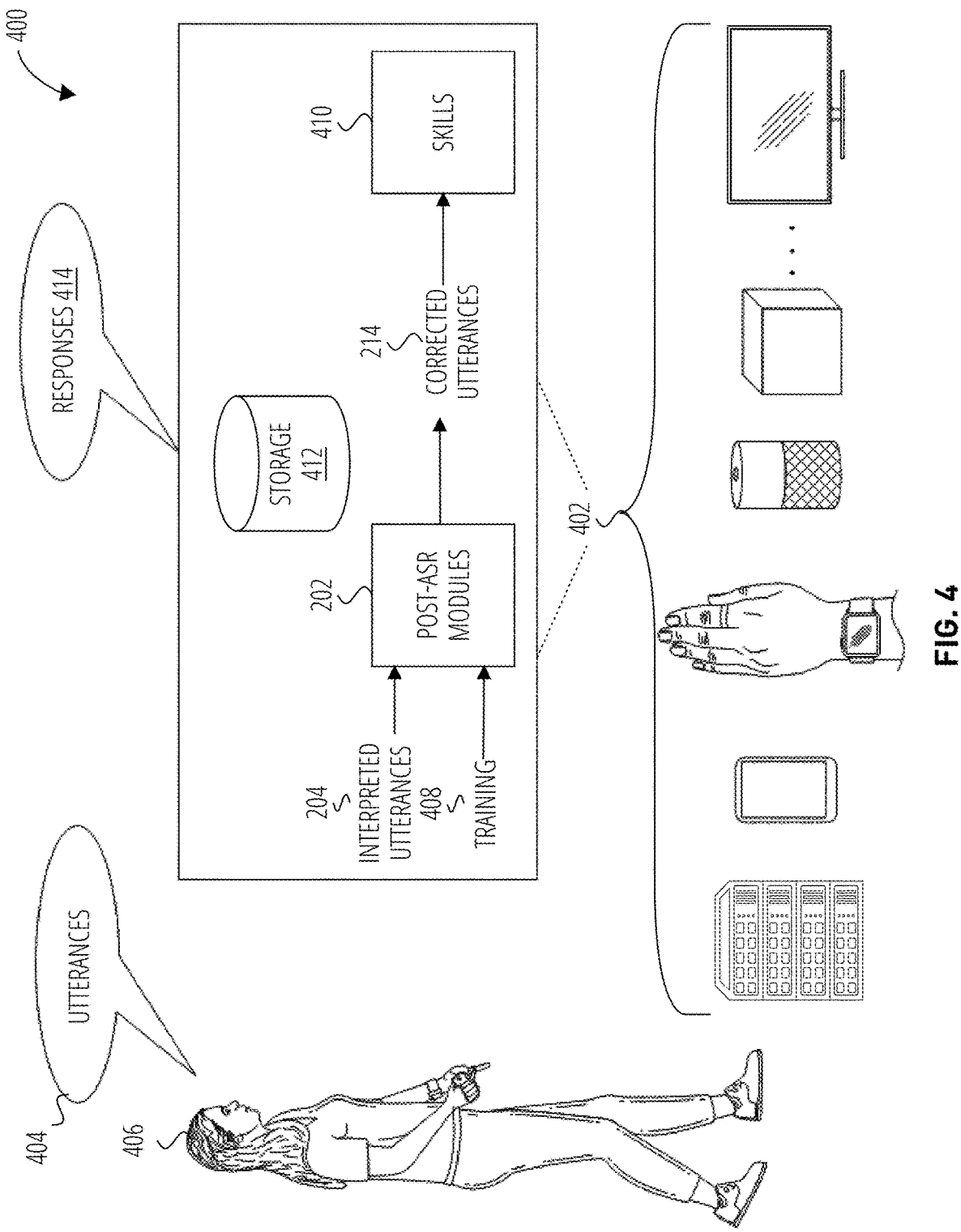
FIG. 4 illustrates an example system for enhanced automatic speech recognition, in accordance with one or more embodiments of the present disclosure.

FIG. 4 illustrates an example system 400 for enhanced automatic speech recognition, in accordance with one or more embodiments of the present disclosure.

Referring to FIG. 4, the system 400 may include devices 402 (e.g., which may include smart phones, tablets, wearable devices, smart home devices, cloud-based servers, and the like), which may detect and analyze the interpreted utterances 204 of FIG. 2 (e.g., ASR interpretations of voice utterances 404) from users (e.g., user 406). The devices 402 may have or be in communication with the post-ASR modules 202 of FIG. 2, which may input training 408 data and the interpreted utterances 204, and generate the corrected utterances 214 of FIG. 2. Skills 410 may receive the corrected utterances 214 and, using data in storage 412, may generate responses 414, which may include audio and/or visual responses.

In one or more embodiments, the skills 410 may include software running on a natural language processing system akin to a software application. The skills 410 may enable the system 400 to execute specific functionality in order to perform one or more actions (e.g., provide information to the user 406, display content to the user 406, output music, or perform some other requested action, any of which may represent the responses 414). The system 400 may be configured with or in communication with more than one skill component. For example, a weather skill component may enable the system 400 to provide weather information, a ride sharing skill component may enable the system 400 to schedule a trip with respect to a ride sharing service, a restaurant skill component may enable the system 400 to order food with respect to a restaurant's online ordering system, a communications skill component may enable the system 400 to perform messaging or multi-endpoint communications, etc.

In one or more embodiments, the functionality described herein as a skill or skill component may be referred to using many different terms, such as an action, bot, app, application, speechlet or the like. The skills 410 may include hardware, software, firmware, or the like that may be dedicated to the particular skill component or shared among different skill components. The skills 410 may be part of a natural language processing system or may be located at whole (or in part) with one or more separate systems. Unless expressly stated otherwise, reference to a skill, skill device, or skill component may include a skill component operating within a natural language processing system and/or skill component operating within a system separate from the natural language processing system.

In one or more embodiments, the skills 410 may be configured to perform one or more actions. A skill may enable the skills 410 to execute specific functionality in order to provide data or produce some other output requested by the user 406. A particular skill component of the skills 410 may be configured to execute more than one skill. For example, a weather skill may involve a weather skill component providing weather information to the system 400, a ride sharing skill may involve a ride sharing skill component scheduling a trip with respect to a ride sharing service, an order pizza skill may involve a restaurant skill component ordering pizza with respect to a restaurant's online ordering system, etc. A skill component of the skills 410 may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, gaming skills, as well as custom skills that are not associated with any pre-configured type of skill. A skill may also be associated with media operations that may be performed by an MPU. This allows a skill development to offer media processing features an independent services that may be invoked by a user. For example, a user may say "Alexa, call mom using CatFace" which may result in the system processing the command to initiate a device-to-device video call between the user's device and a device belonging to the user's mother, while routing the video call through an MPU associated with the "CatFace" skill, which may perform media operations such as recognizing a human face and replacing it with a cat face. As can be appreciated, many different media processing skills may be implemented.

In one or more embodiments, the system 400 may generate the responses 414 by generating audio data from the corrected utterances 214 using one or more different techniques, such as matching text data against recorded speech (e.g., in the storage 412).

In one or more embodiments, the storage 412 may include product and/or content catalogs in order to respond to the utterances 404 (e.g. by allowing the system 400 to identify products and/or content to purchase and/or present to a user). The storage 412 may store information that may be used to respond to queries.

In one or more embodiments, to reduce ASR misrecognitions of voice utterances, the post-ASR modules 202 may learn the most likely misrecognitions of voice utterances (e.g., using the training 408), bypassing the need for audio simulation and expensive ASR decoding (e.g., the speech recognition 116 of FIG. 1A). In this manner, the post-ASR modules 202 may learn the different ways that an utterance may be misrecognized without having to analyze a previous TTL plus ASR decoding to identify whether the previous TTL plus ASR decoding was properly recognized. To avoid analysis of a previous TTL plus ASR decoding, the post-ASR modules 202 may be trained with error prompts, including the ways that a given utterance may be misrecognized (e.g., the training 408). In this manner, the post-ASR modules 202 may use a "corrupt" prefix to generate the likely misrecognition, and with beam search decoding, the post-ASR modules 202 may generate different ways that any utterance may be misrecognized.

In one or more embodiments, the post-ASR modules 202 may detect recognition errors in the utterances 404, correct the errors, identify misrecognized tokens, and predict likely misrecognitions from synthetic text utterances. Architecturally, the post-ASR modules 202 may be, but is not limited to, a sequence-to-sequence text-only model with BART-large, which may accept an input text utterance with a prefix or prompt indicating a desired outcoming that includes "corrupt," "correct," "predict", or "is error?" The post-ASR modules 202 may be obtained by fine-tuning BART-large with a large-scale multi-task dataset of ASR transcriptions. The post-ASR modules 202 may model error correction by accepting an utterance with or without misrecognitions, and autoregressively generating an utterance with a correction or emitting the input as-is when there is nothing to correct. The post-ASR modules 202 may model corruption by accepting a synthetic text utterance that is error-free, and autoregressively generating possible ways that the utterance may be misrecognized (e.g., "brain bag" vs. "drain bag" as described above). The post-ASR modules 202 may model error detection by accepting an utterance with or without misrecognition, and generating an "error" or "no error" output. The post-ASR modules 202 may model incorrect token prediction by accepting an utterance with or without misrecognition, and generating one or more tokens representing likely ASR misrecognitions or emitting "no error" when an utterance is error-free.

In one or more embodiments, the post-ASR modules 202 may detect and correct misrecognized utterances without requiring feedback indicating whether a previous TTL plus ASR interpretation of an utterance was correct or misrecognized. The training 408 for the post-ASR modules 202 may be input with ASR error correction, corruption, error detection, and incorrect token prediction datasets that may be distinguished from feedback indicating whether a previous TTL plus ASR interpretation of an utterance was correct or misrecognized. As a result, the post-ASR modules 202 may avoid misrecognitions and may be less expensive and time-consuming than a two-staged TTS simulation followed by ASR decoding using a target ASR model (e.g., the speech recognition 116).

Figure 5:
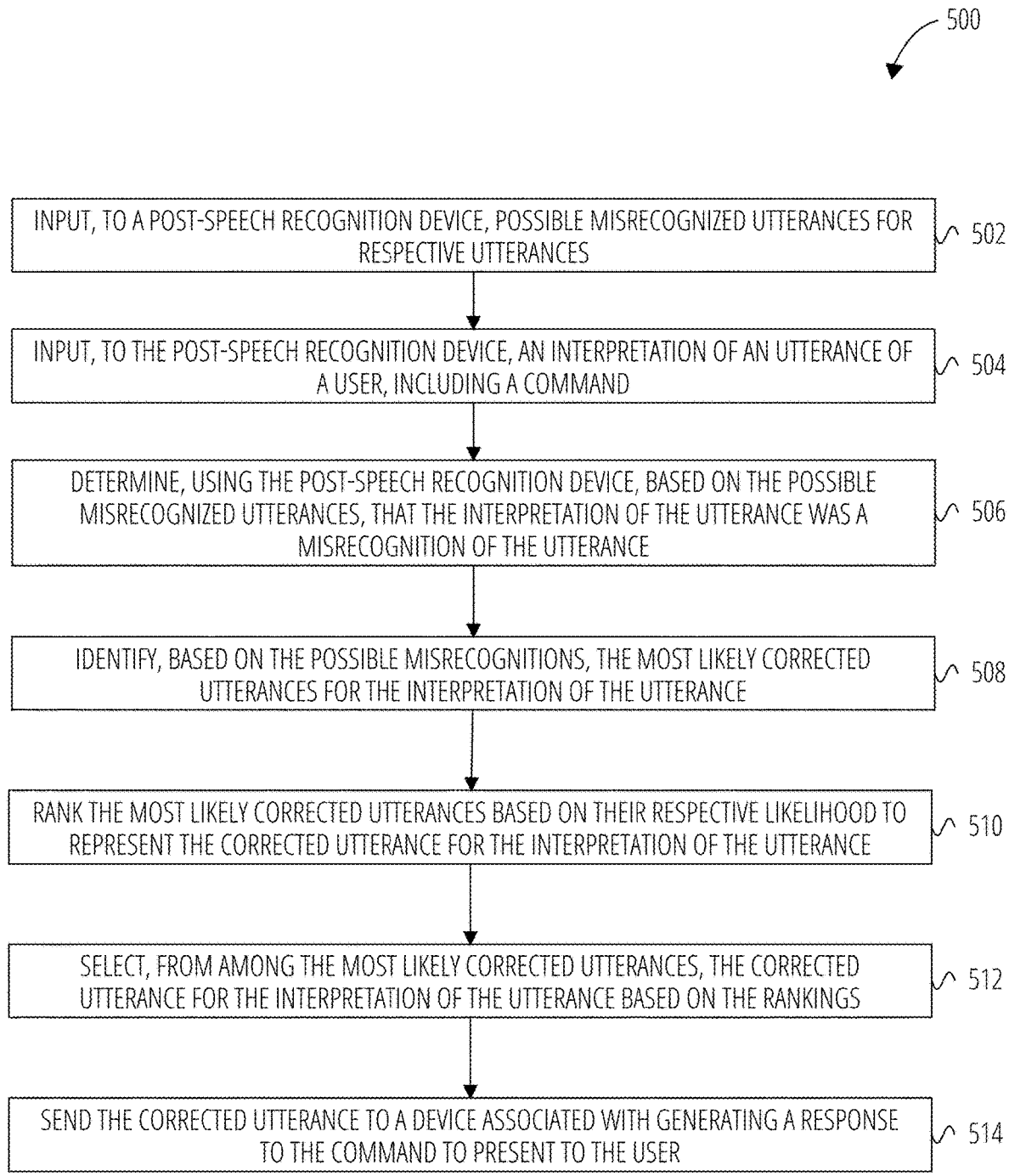
FIG. 5 illustrates an example flow of a process for automatic speech recognition, in accordance with one or more embodiments of the present disclosure.

FIG. 5 illustrates an example flow of a process 500 for automatic speech recognition, in accordance with one or more embodiments of the present disclosure.

Figure 6:
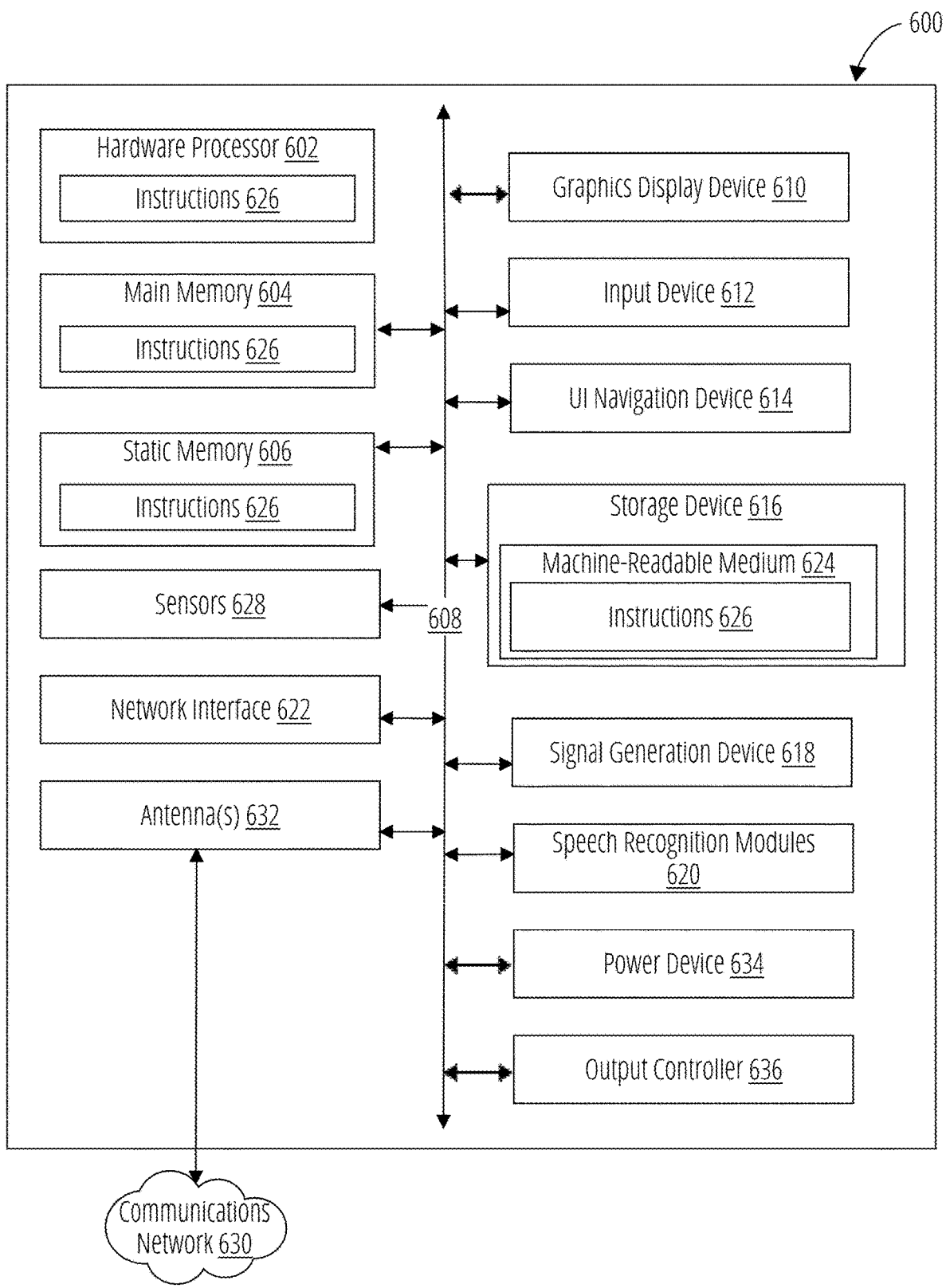
FIG. 6 is a block diagram of an example machine upon which any of one or more techniques (e.g., methods) may be performed, in accordance with one or more embodiments of the present disclosure.

At block 502, a device (or system, e.g., the device 108, the device 110, the device 112, the post-ASR modules 124, the post-ASR modules 202, the devices 402, the speech recognition modules 620 of FIG. 6) may input, to a post-speech recognition device (e.g., the post-ASR modules 124, the post-ASR modules 202), possible misrecognized utterances for respective utterances. The possible misrecognized utterances are unassociated with feedback indicative of whether utterances previously interpreted by the post-speech recognition device and/or an ASR technique were misrecognized. The training data for the post-speech recognition device may be input with ASR error correction, corruption, error detection, and incorrect token prediction datasets that may be distinguished from feedback indicating whether a previous TTL plus ASR interpretation of an utterance was correct or misrecognized. As a result, the post-speech recognition device may avoid misrecognitions and may be less expensive and time-consuming than a two-staged TTS simulation followed by ASR decoding using a target ASR model.

At block 504, the device may input, to the post-speech recognition device, an interpretation of an utterance of a user (e.g., the utterance 122, the utterance 134, the interpreted utterances 204, the utterances 404), such as an interpretation produced by an ASR technique. The utterance may include a command, such as a request for an answer to a question, a command to play content (e.g., audiobooks, songs, video titles, etc.), a command to purchase or learn more about a product, or the like. In this manner, the post-speech recognition device may analyze previously interpreted utterances to verify whether the utterance interpretations were correct or not.

At block 506, the device may determine, using the post-speech recognition device, based on the possible misrecognized utterances, that the interpretation of the utterance was a misrecognition by ASR (e.g., the ASR recognition of the utterance was incorrect).

At block 508, the device may identify, based on the possible misrecognitions, the k-most likely corrected utterances for the interpretation of the utterance. At block 510, the device may rank the most likely corrected utterances based on their respective likelihood to represent the corrected utterance for the interpretation of the utterance. For example, the rankings may be log-likelihood scores. At block 512, the device may select, from among the most likely correct utterances, the corrected utterance to replace the interpretation of the utterance based on the rankings (e.g., select the corrected utterance most likely to represent the ground truth of the utterance whose interpretation was identified as misrecognized).

At block 514, the device may send the corrected utterance selected to replace the misrecognized interpretation of the utterance to a device (e.g. using the skills 410) that may generate a response to the command to present to the user.

These examples are not intended to be limiting.

FIG. 6 is a block diagram of an example machine 600 upon which any of one or more techniques (e.g., methods) may be performed, in accordance with one or more embodiments of the present disclosure.

In other embodiments, the machine 600 may operate as a standalone device or may be connected (e.g., networked) to other machines. In a networked deployment, the machine 600 may operate in the capacity of a server machine, a client machine, or both in server-client network environments. The machine 600 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine 600 (e.g., computer system) may include a hardware processor 602 (e.g., a central processing unit (CPU), a graphics processing unit (GPU), a hardware processor core, or any combination thereof), a tensor processing unit (TPU), a main memory 604 and a static memory 606, some or all of which may communicate with each other via an interlink (e.g., bus 608). The machine 600 may further include a power device 634, a graphics display device 610, an input device 612 (e.g., a keyboard), and a user interface UI navigation device 614 (e.g., a mouse). In an example, the graphics display device 610, input device 612, and UI navigation device 614 may be a touch screen display. The machine 600 may additionally include a storage device 616, a signal generation device 618, one or more speech recognition modules 620 (e.g., representing any combination of the post-ASR modules 124 of FIG. 1A, the post-ASR modules 202 of FIG. 2, capable of performing the processes in FIGS. 1-5), a network interface 622 coupled to antenna(s) 632, and one or more sensors 628. The machine 600 may include an output controller 636, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine-readable medium 624 on which is stored one or more sets of data structures or instructions 626 (e.g., software) embodying or utilized by any one or more of the techniques or functions described herein. The instructions 626 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 624 is illustrated as a single medium, the term "machine-readable medium" may include a single medium or multiple media (e.g., a centralized or distributed database, and/or associated caches and servers) configured to store the one or more instructions 626.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 626 may further be transmitted or received over a communications network 630 using a transmission medium via the network interface 622 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, among others. In an example, the network interface 622 may include one or more physical jacks (e.g., Ethernet, coaxial, or phone jacks) or one or more antennas to connect to the communications network 630. In an example, the network interface 622 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component.

Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for detecting misrecognized voice utterances for which automated responses are presented, the method comprising:
    inputting, to a post-speech recognition device, possible misrecognized utterances for respective utterances, wherein the possible misrecognized utterances are unassociated with feedback indicative of whether utterances previously identified by the post-speech recognition device were misrecognized;
    inputting, to the post-speech recognition device, an automatic speech recognition (ASR) interpretation of an utterance of a user, the utterance comprising a command;
    determining, using an ASR model, based on the possible misrecognized utterances, that the ASR interpretation of the utterance is a misrecognition of the utterance using ASR;
    identifying, using the post-speech recognition device, based on the possible misrecognized utterances, a first corrected utterance for the ASR interpretation of the utterance, wherein the first corrected utterance is different than the ASR interpretation of the utterance;
    identifying, using the post-speech recognition device, based on the possible misrecognized utterances, a second corrected utterance for the ASR interpretation of the utterance, wherein the second corrected utterance is different than the ASR interpretation of the utterance;
    determining, using the post-speech recognition device, that the first corrected utterance is more likely than the second corrected utterance to represent a ground truth of the utterance;
    selecting, using the post-speech recognition device, based on the first corrected utterance being more likely to represent the ground truth, the first corrected utterance to replace the ASR interpretation of the utterance; and
    sending the first corrected utterance to a device associated with generating a response to the command to present to the user.

2. The method of claim 1, further comprising:
    inputting, to the post-speech recognition device, training data comprising:
    an error correction dataset comprising first utterances with ASR misrecognitions and second utterances for which the ASR misrecognitions are corrected,
    a corruption dataset comprising synthetic text utterances without the ASR misrecognitions and third utterances representing possible ASR misrecognitions of the synthetic text utterances,
    an error detection dataset comprising comprises fourth utterances with respective tags indicating presence of the misrecognition or no presence of a misrecognition, and
    an incorrect token prediction dataset comprising fifth utterances representing predicted misrecognitions,
    wherein identifying the first corrected utterance and identifying the second corrected utterance are further based on the training data.

3. The method of claim 2, wherein the post-speech recognition device comprises a model comprising multiple encoder layers and multiple decoder layers trained using cross-entropy loss.

4. The method of claim 1, wherein the command is to present content, and wherein the response is the content.

5. The method of claim 1, wherein the command is to purchase a product, and wherein the response comprises an indication of the product.

6. A method for detecting misrecognized voice utterances for which automated responses are presented, the method comprising:
    inputting, to a post-speech recognition device, possible misrecognized utterances for respective utterances;
    inputting, to the post-speech recognition device, an interpretation of an utterance of a user, the utterance comprising a command;

determining, using the post-speech recognition device, based on the possible misrecognized utterances, that the interpretation of the utterance is a misrecognition of the utterance;
identifying, using the post-speech recognition device, based on the possible misrecognized utterances, a corrected utterance for the interpretation of the utterance, wherein the corrected utterance is different than the interpretation of the utterance;
selecting, using the post-speech recognition device, the corrected utterance to replace the interpretation of the utterance; and
sending the corrected utterance to a device associated with generating a response to the command to present to the user.

7. The method of claim 6, further comprising:
inputting, to the post-speech recognition device, training data comprising:
an error correction dataset comprising first utterances with ASR misrecognitions and second utterances for which the ASR misrecognitions are corrected,
a corruption dataset comprising synthetic text utterances without the ASR misrecognitions and third utterances representing possible ASR misrecognitions of the synthetic text utterances,
an error detection dataset comprising comprises fourth utterances with respective tags indicating presence of the misrecognition or no presence of a misrecognition, and
an incorrect token prediction dataset comprising fifth utterances representing predicted misrecognitions,
wherein identifying a first corrected utterance and identifying a second corrected utterance are further based on the training data.

8. The method of claim 7, wherein the post-speech recognition device comprises a model comprising multiple encoder layers and multiple decoder layers trained using cross-entropy loss.

9. The method of claim 6, wherein the command is to present audiobook content, and wherein the response is the audiobook content.

10. The method of claim 6, wherein the command is to present a song, and wherein the response is the song.

11. The method of claim 6, wherein the command is to present video content, and wherein the response is the video content.

12. The method of claim 6, wherein the command is to purchase a product, and wherein the response comprises an indication of the product.

13. The method of claim 6, wherein the command is a question, and wherein the response comprises an audio answer to the question.

14. The method of claim 6, further comprising:
identifying, using the post-speech recognition device, based on the possible misrecognized utterances, a second corrected utterance for the interpretation of the utterance, wherein the corrected utterance is different than the interpretation of the utterance; and
determining, using a speech recognition model, that the corrected utterance is more likely than the second corrected utterance to represent a ground truth of the utterance,
wherein selecting the corrected utterance to replace the interpretation of the utterance is based on the corrected utterance being more likely to represent the ground truth.

15. The method of claim 6, wherein the possible misrecognized utterances are unassociated with feedback indicative of whether utterances previously identified by the post-speech recognition device were misrecognized.

16. The method of claim 15, wherein the possible misrecognized utterances are received from at least one of content providers associated with the response or product sellers associated with the response.

17. A system for detecting misrecognized voice utterances for which automated responses are presented, the system comprising:
a post-speech recognition device trained to identify and correct misrecognized utterances; and
memory coupled to at least one processor, the at least one processor configured to:
input, to the post-speech recognition device, possible misrecognized utterances for respective utterances;
input, to the post-speech recognition device, an interpretation of an utterance of a user, the utterance comprising a command;
determine, using the post-speech recognition device, based on the possible misrecognized utterances, that the interpretation of the utterance is a misrecognition of the utterance;
identify, using the post-speech recognition device, based on the possible misrecognized utterances, a corrected utterance for the interpretation of the utterance, wherein the corrected utterance is different than the interpretation of the utterance;
select, using the post-speech recognition device, the corrected utterance to replace the interpretation of the utterance; and
send the corrected utterance to a device associated with generating a response to the command to present to the user.

18. The system of claim 17, wherein the at least one processor is further configured to:
input, to the post-speech recognition device, training data comprising:
an error correction dataset comprising first utterances with ASR misrecognitions and second utterances for which the ASR misrecognitions are corrected,
a corruption dataset comprising synthetic text utterances without ASR misrecognitions and third utterances representing possible ASR misrecognitions of the synthetic text utterances,
an error detection dataset comprising comprises fourth utterances with respective tags indicating presence of a misrecognition or no presence of a misrecognition, and
an incorrect token prediction dataset comprising fifth utterances representing predicted misrecognitions,
wherein identifying a first corrected utterance and identifying a second corrected utterance are further based on the training data.

19. The system of claim 18, wherein the post-speech recognition device comprises a model comprising multiple encoder layers and multiple decoder layers trained using cross-entropy loss.

20. The system of claim 17, wherein the possible misrecognized utterances are unassociated with feedback indicative of whether utterances previously identified by the post-speech recognition device were misrecognized.

* * * * *